United States Patent [19]

Rutz

[11] Patent Number: 5,265,313
[45] Date of Patent: Nov. 30, 1993

[54] APPARATUS FOR A TENTERING CHAIN HAVING TENTERING CLAMPS WITH A CONTINUOUSLY VARIABLE PITCH BETWEEN TWO NEIGHBORING CLAMPING BODIES

[75] Inventor: Andreas Rutz, Lindau, Fed. Rep. of Germany

[73] Assignee: Lindauer Dornier Gesellschaft mbH, Lindau, Fed. Rep. of Germany

[21] Appl. No.: 915,416

[22] Filed: Jul. 17, 1992

[30] Foreign Application Priority Data

Jul. 18, 1991 [DE] Fed. Rep. of Germany ....... 4123840

[51] Int. Cl.$^5$ .............................................. D06C 3/00
[52] U.S. Cl. ............................................ 26/73; 26/93
[58] Field of Search ............... 26/18.5, 73, 72, 71, 26/91, 93, 52; 264/289.6, 290.2

[56] References Cited

U.S. PATENT DOCUMENTS

| | | |
|---|---|---|
| 4,330,499 | 5/1982 | von und zu Aufsess et al. ................................... 1.26/18.5 |
| 4,637,103 | 1/1987 | Hutzenlaub ............................. 26/73 |
| 4,807,336 | 2/1989 | Yoshimura et al. ...................... 26/73 |
| 4,890,365 | 1/1990 | Langer . |
| 5,161,674 | 11/1992 | Rutz et al. ............................... 26/73 |

FOREIGN PATENT DOCUMENTS 3716603  5/1987  Fed. Rep. of Germany .

*Primary Examiner*—Clifford D. Crowder
*Assistant Examiner*—Amy Brooke Vanatta
*Attorney, Agent, or Firm*—W. G. Fasse

[57] ABSTRACT

In order to achieve a controlled longitudinal shrinkage of a film web, an adjusting mechanism including a threaded spindle with a cross-piece is provided between neighboring clamping bodies along the tentering chain. The cross-piece is equipped with control rollers that are radially arranged around the longitudinal axis of the threaded spindle and spaced from one another by an angular spacing of, for example, 90° between neighboring control rollers. The control rollers intermittently engage a control rail that has operational segments of a multiple leads screw guide track.

11 Claims, 3 Drawing Sheets

APPARATUS FOR A TENTERING CHAIN HAVING TENTERING CLAMPS WITH A CONTINUOUSLY VARIABLE PITCH BETWEEN TWO NEIGHBORING CLAMPING BODIES

FIELD OF THE INVENTION

The invention relates to a tentering clamp arrangement with a continuously variable spacing or pitch for the simultaneously biaxial treatment of film webs. The arrangement has clamping components that clamp both edges of a film web. The clamping components are attached to clamping bodies equipped with journal bolts, whereby each clamping body carries several roller arrangements rolling along guide surfaces of guide rails for a vertical and horizontal guiding. The clamping bodies are connected in pairs with an adjusting mechanism for contacting a control rail for a continuous spacing variation of the pitch between two neighboring clamping bodies.

According to DE Patent 3,716,603, corresponding to U.S. Pat. No. 4,890,365 (Langer), issued Jan. 2, 1990 an apparatus for simultaneously treating film webs biaxially is known, wherein tentering clamps are interconnected by chain strands. The interconnection of two tentering clamps is achieved by loose chain links, whereby a suitable control means for spacing and thus pitch variation is effective on a journal bolt. One of the loosely interconnected chain links is formed as a bell-crank that carries a guide roller on its free arm extending past the journal bolt, said guide roller cooperating with a control rail to push the linearly extending arrangement of chain links into an angular arrangement and vice versa. Thus, the lengthwise spacing or pitch between two consecutive tentering clamps can be adjusted by this arrangement.

However, a disadvantage is recognized in that the individual tentering clamps must be equipped with at least one, preferably two chain links, one link that is effective below and one link that is effective above the tenter body. Thus, each clamp has several journals which are subject to considerable wear and tear.

OBJECTS OF THE INVENTION

Therefore, it is an object of the present invention to construct a device for continuously varying the spacing or pitch in tentering clamp arrangements for simultaneously treating film webs biaxially, thereby avoiding the use of a conventional chain link plate connection between individual tentering clamps forming a tentering chain. The present device also shall avoid using a costly level and joint arrangement for influencing the spacing or pitch between two consecutive tentering clamps in the tentering chain for achieving a controlled longitudinal shrinkage. A further object of the invention is to construct a control rail that conforms to the device, which makes a precisely controlled and reproducible longitudinal shrinkage of the film web possible.

SUMMARY OF THE INVENTION

According to the invention the pitch of a tentering chain carrying a plurality of tentering clamp arrangements is continuously variable for a simultaneous biaxial treatment of film webs. The pitch is defined as a spacing between two neighboring clamp bodies carrying tentering clamps for gripping both edges of a film web. Each clamp body carries several rollers rolling along guide tracks formed by stationary guide rails for a vertical and horizontal guiding when the tentering chain travels along said guide rails. A pitch adjusting mechanism interconnects two clamp bodies forming a pair, to provide a continuous pitch variation as the chain travels along the guide rails. For this purpose the pitch adjusting mechanism comprises a threaded spindle with a first spindle section having a right-handed threading and a second spindle section having a left-handed threading. The spindle sections are interconnected by a cross-piece centrally located between the threaded spindle sections. The cross-piece has, for example, four arms each carrying at its free end a control roller (19, 19', 19", 19'''). The arms are arranged to extend radially around a longitudinal spindle axis, whereby these arms of the cross-piece are circumferentially spaced from each other by an angular spacing, and whereby each of said control rollers (19, 19', 19", 19''') intermittently contacts said guide rail (20) as the tentering chain travels along the guide rail. Each clamp body of two neighboring clamp bodies forming a pair has a threaded hole threadedly engaged with the respective spindle section. The control rollers rotate the spindle for the pitch adjustment.

Through the solution according to the invention, a sensitive spacing or pitch variation is achieved inside the clamping arrangement without the chain link plates and without the bell-crank used heretofore as a control means.

BRIEF DESCRIPTION OF THE DRAWINGS

An example embodiment of the invention is described in the following with reference to the accompanying drawings.

DETAILED DESCRIPTION OF PREFERRED EXAMPLE EMBODIMENTS AND OF THE BEST MODE OF THE INVENTION

Figure 1:
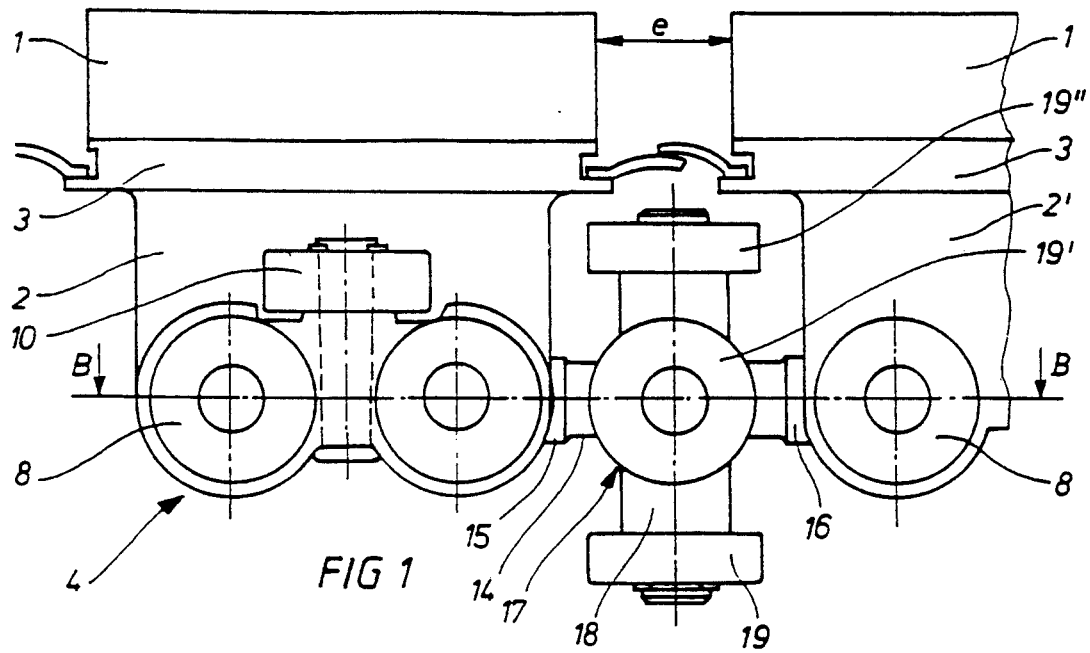
FIG. 1 illustrates one completely illustrated roller body of a tentering clamp, whereby the body is interconnected with another only partially shown roller body, by an adjusting mechanism according to the view "A" in FIG. 2.
Figure 2:
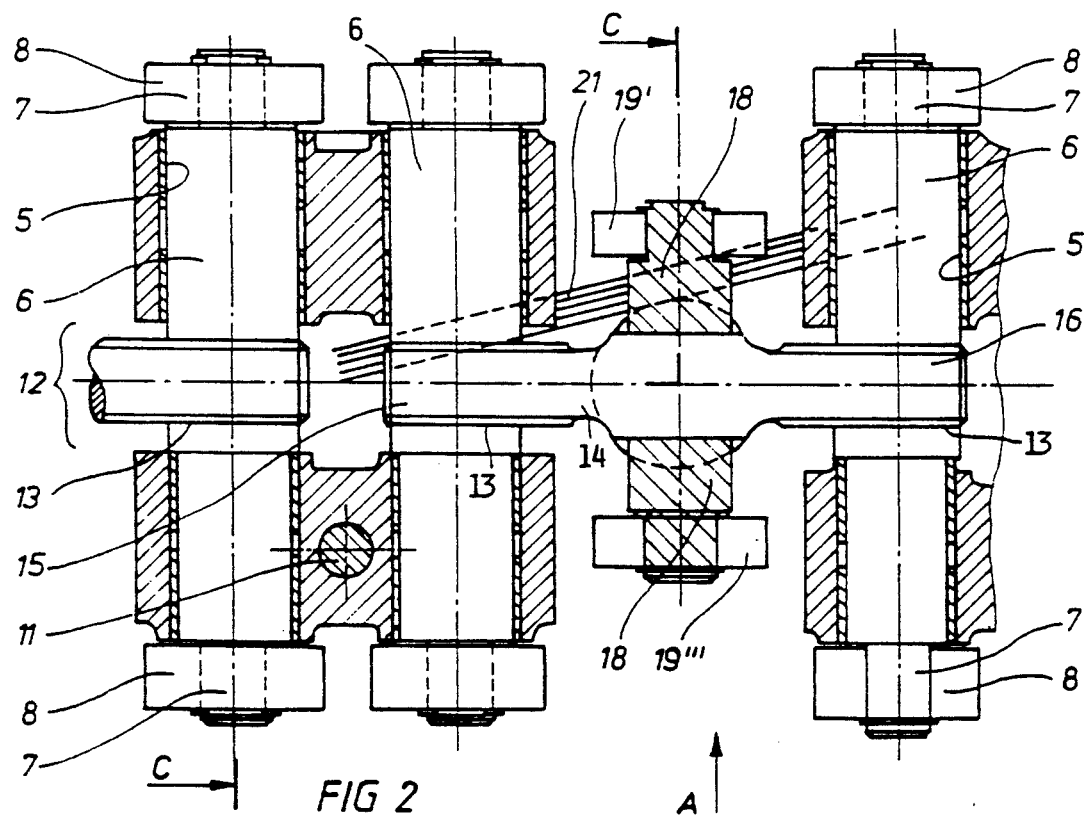
FIG. 2 shows a cross-sectional view along line B—B in FIG. 1.

FIG. 1 shows only that portion of the tentering clamp which is the component referred to as roller body 2, that carries the clamping unit 1.

The clamping unit 1, which is not individually shown, is carried by the roller body 2 through a connecting plate 3 which is part of the roller body 2. The roller body 2 has through bores in its outer surface region 4 opposite to the connecting plate 3. Each of the through bores that are aligned and lying opposite one another, takes up a bearing bushing 5. A common journal bolt 6 is rotatably mounted in both bearing bushings 5.

The journal bolt 6 has an axle stub 7 at its upper and lower free ends. Each axle stub carries a guide roller 8. Each guide roller 8 is rotatably mounted on each of the axle stubs 7 and guided in a horizontal plane between guide tracks 9 of guide bands. A further roller 10 acting as a carrier roller for each tentering clamping body, is rotatably arranged on the free end of a transverse axle 11 in the lower portion of the roller body 2. This carrier roller 10 takes up the weight of the tentering clamping body comprising the roller body 2 and the clamping unit 1. For this purpose the carrier roller rolls along the narrow side of one of the guide tracks 9 in a supporting manner.

Each of the journal bolts 6 has a transverse threaded hole 13 with a relatively small thread pitch in the region of the journal bolt segment 12 lying between the upper and lower portion of the roller body 2. It is important that one journal bolt of the roller body 2, 2' has a right-handed threading and that the other journal bolt of a pair of such journal bolts has a left-handed threading.

Between the roller bodies 2, 2' there is a threaded spindle 14 forming an adjusting mechanism, having a right-handed threaded spindle segment 15 and a left-handed threaded segment 16, whereby the threaded spindle 14 comprises a central cross-piece 17 located between the spindle segments 15 and 16. The central cross-piece 17 has arms 18 each carrying at a free arm end a respective control roller 19, 19', 19'', 19''' mounted radially around the longitudinal axis of the threaded spindle 14 at angularly spaced positions. As shown in FIG. 1, the respective angular spacing between the rotational axes of the control rollers 19, 19', 19'', and 19''' is 90°, for example. Each of the spindle segments 15, 16 of the threaded spindle 14 is engaged with the respective threaded hole 13 in the corresponding journal bolt 6 positioned opposite respective spindle segment.

In an alternative embodiment of the invention, the journal bolts 6 have instead of the threaded hole 13, a threaded bolt that is rigidly connected to its journal bolt 6. These threaded bolts are arranged diametrically opposite of one another and are interconnected at their free ends with a central adjusting nut having right- and left-hand threading sections. The central adjusting nut thereby corresponds to the cross-piece. The function is the same in both instances.

Figure 3:
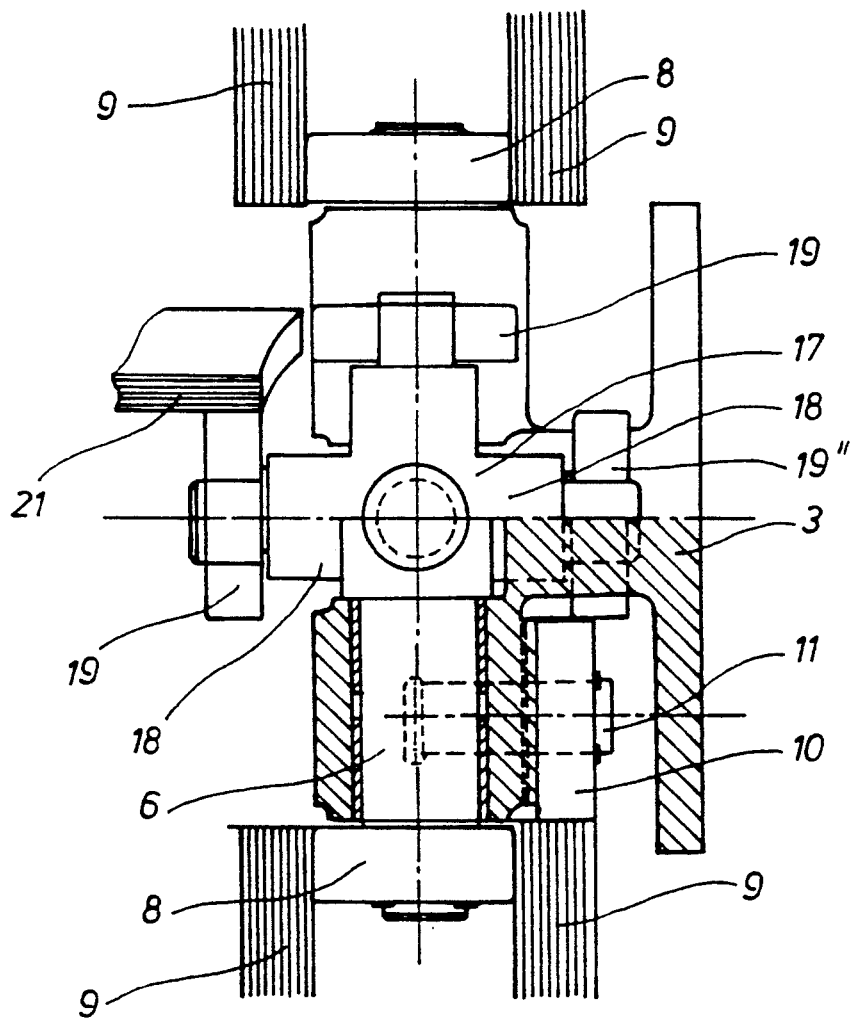
FIG. 3 shows a cross-sectional view along line C—C in FIG. 2.
Figure 4:
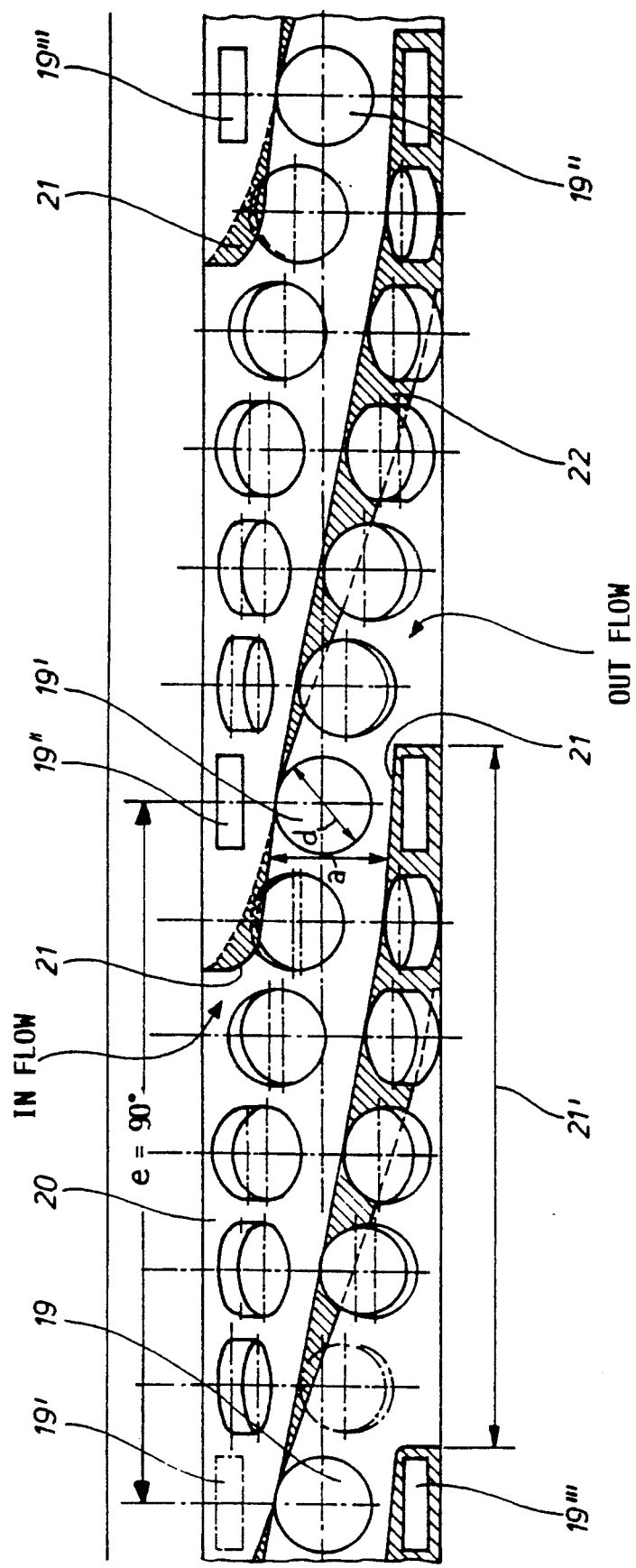
FIG. 4 shows a front view of the control rail that cooperates with the adjusting mechanism.

FIGS. 3 and 4 show the screw guide track 21 of a stationary control rail 20. The control rollers 19, 19', 19'', 19''' of the cross-piece 17 sequentially contact the guide track 21 as the tentering chain travels along the control rail 20. However, in FIG. 3 only a portion of the screw guide track 21 that is arranged on the control rail 20, is shown.

FIG. 4 shows a front view of the control rail 20 with the screw-shaped guide tracks 21. The individual operation segments of a multiple threading screw guide track 21 having flanks 22, are shown at 21'.

As seen in FIG. 4, the output or out flow of one screw guide track 21 is overlapped by the inlet or in flow of the other screw guide track 21. The thread lead of the segments of the individual screw guide tracks 21 can be selected, for example, so that, in cooperation with the control rollers 19, 19', 19'', 19''', after passing the fourth operation segment 21', the cross-piece 17 and thereby the threaded spindle 14 have rotated through a rotational angle of 360°. Thus, the spacing "e" (FIG. 1) and thereby the pitch between two neighboring clamping bodies 1 can be varied by increasing or decreasing.

In order that the control rollers 19, 19', 19'', 19''' can roll along unhindered between the flanks 22, especially in the region of overlapping between the outlet of one screw guide track 21 and the inlet of the next screw guide track 21, the spacing "a" in the overlapping region of the screw guide tracks 21 is larger than the diameter "d" of the control rollers 19, 19', 19'', 19'''.

The control rail 20 shown in FIG. 4 can be constructed as a compact segment, that can be pushed, for example, into a base body which also carries the guide track 9 for the tentering clamp. The control rail 20 thereby comprises a single component, that is the rail 20 and the screw guide track 21 are produced by a chip removing cutting operation or by a metal casting method.

It is also possible that the screw guide tracks 21 be made of flexible guide bands that can be adapted to the pitch and mounted on the control rail 20.

Although the invention has been described with reference to specific example embodiments it will be appreciated that it is intended to cover all modifications and equivalents within the scope of the appended claims.

I claim:

1. An apparatus for continuously varying the pitch between a first tentering clamp body and a neighboring second tentering clamp body forming a pair of clamp bodies of a tentering chain for a simultaneous biaxial treatment of film webs, said apparatus comprising stationary guide rail means forming guide tracks for said tentering chain travelling along said guide rail means, a pitch adjusting mechanism for said pair of clamp bodies, said adjusting mechanism comprising first threaded means with a first right-hand thread and with a first left-hand thread forming part of said tentering clamp bodies, second threaded means with a second right-hand thread and with a second left-hand thread for engaging said first threaded means, respectively, for adjustably interconnecting said first and second tentering clamp bodies, a plurality of control rollers (19, 19', 19'',19''') spaced about said second threaded means and rotatably connected thereto for rotating said second threaded means around a longitudinal adjustment axis of said first and second threaded means in response to said control rollers contacting said guide tracks as said tentering chain travels along said guide tracks.

2. The apparatus of claim 1, wherein said first threaded means comprise two threaded holes axially aligned relative to said longitudinal adjustment axis in said first and second tentering clamp bodies, wherein said second threaded means comprise a threaded spindle having said second right-hand thread along a first spindle section and said second left-hand thread along a second spindle section, said adjusting mechanism further comprising a cross-piece rigidly connected between said first and second spindle sections, said cross-piece comprising a number of arms corresponding to said plurality of control rollers, said arms extending radially away from said longitudinal adjustment axis, each arm having a free end to which one of said control rollers is rotatably mounted for rotating said threaded spindle for varying said pitch in response to said control rollers contacting said guide tracks as said tentering chain travels along said guide track.

3. The apparatus of claim 2, wherein said arms of said cross-piece are circumferentially spaced about said longitudinal adjustment axis by an angular on-center spacing between neighboring arms.

4. The apparatus of claim 1, wherein said guide tracks of said stationary guide rail means (20) comprise lead track segments (21, 21') forming a multiple lead screw guide track along said stationary guide rail means (20), and wherein said control rollers (19, 19', 19'', 19''') intermittently contact said multiple lead screw guide track in response to said tentering chain travelling along said stationary guide rail means (20) for rotating said second thread means.

5. The apparatus of claim 4, wherein said lead track segments (21, 21') have overlapping track portions with a spacing (a) between said overlapping track portions to form guide channel sections having a channel inlet and a channel outlet for guiding said control rollers (19, 19', 19", 19'") through said guide channel sections.

6. The apparatus of claim 5, wherein said control rollers have a diameter (d) and wherein said spacing (a) between said overlapping track portions is larger than said diameter (d).

7. The apparatus of claim 4, wherein said lead track segments (21, 21') of said stationary guide rail means (20) comprise a constant screw pitch.

8. The apparatus of claim 4, wherein said lead track segments (21, 21') of said stationary guide rail means (20) comprise a varying screw pitch that varies along said guide rail means.

9. The apparatus of claim 4, wherein said stationary guide rail means are rigid.

10. The apparatus of claim 4, wherein said stationary guide rail means comprise flexible and adjustable guide bands (9).

11. The apparatus of claim 10, wherein said guide bands (9) form compact guide track segments.

* * * * *